Dec. 15, 1953
I. E. COFFEY
2,662,723
CHECK VALVE
Filed Jan. 10, 1950
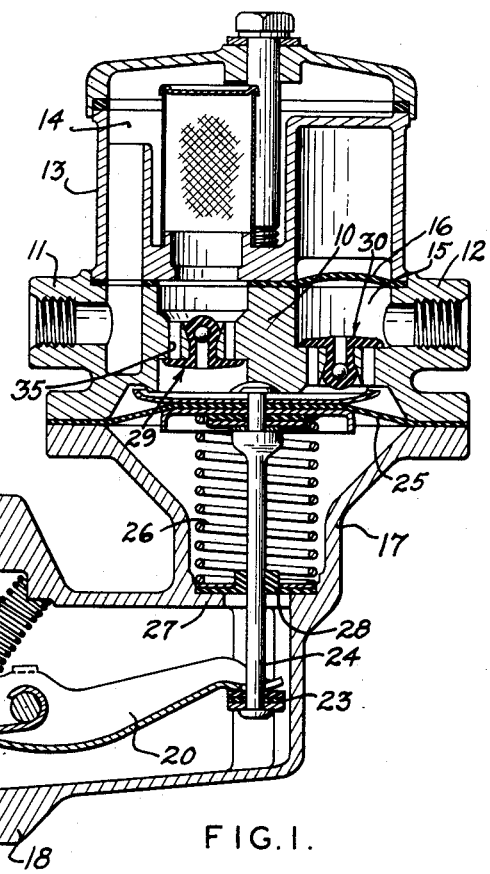
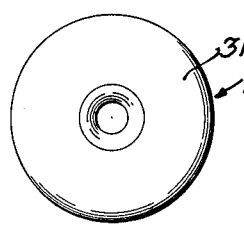
FIG. 2.
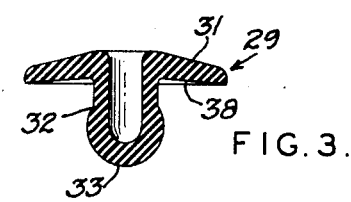
FIG. 3.
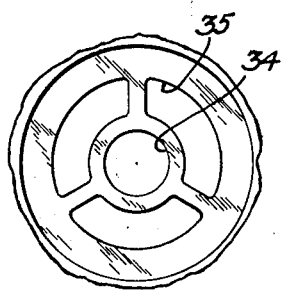
FIG. 1.
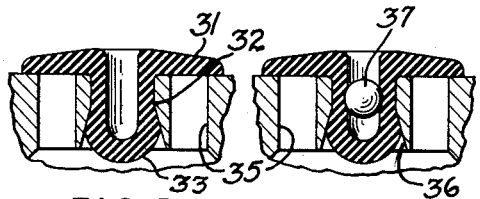
FIG. 5. FIG. 6. FIG. 7. FIG. 8.
FIG. 4.
*INVENTOR.*
IRVEN E. COFFEY
BY
ATTORNEY Patented Dec. 15, 1953

2,662,723

UNITED STATES PATENT OFFICE 2,662,723

CHECK VALVE

Irven E. Coffey, Clayton, Mo., assignor to Carter Carburetor Corporation, St. Louis, Mo., a corporation of Delaware Application January 10, 1950, Serial No. 137,811

1 Claim. (Cl. 251—119)

This invention relates to check valve assemblies, particularly of the type maintained yieldingly in engagement with a port.

The novel check valve is especially adapted for use in an automotive fuel pump of the type covered in my Patent No. 2,426,965. As shown in that patent, and as in general use in such fuel pumps, each check valve is formed of a disk yieldingly urged against the valve port or seat by a spring. The object of the present invention is to provide a valve which is simpler and less expensive to manufacture and assemble than valve devices of the above type.

In the accompanying drawing which illustrates the invention,

Fig. 1 is a vertical section through an automotive fuel pump embodying two of the novel check valves.

Fig. 2 is a top plan view of one of the checks considerably enlarged.

Fig. 3 is a transverse section through the check valve.

Fig. 4 is a plan view of the valve porting with the valve removed.

Fig. 5 is a section through the valve and port assembly enlarged.

Fig. 6 is a view similar to Fig. 5, but showing the securing ball being inserted.

Fig. 7 is a view similar to Figs. 5 and 6, but showing the ball in its valve shank distending position.

Fig. 8 shows the yielding disk portion of the valve distorted, as by the application of fluid pressure to its under side.

The pump shown in Fig. 1 is described and claimed in my above mentioned patent. However, in general, the pump comprises an intermediate body portion 10 having threaded inlet and outlet connections 11 and 12, and an upper portion 13 forming inlet dome structure 14 and an outlet dome 15 closed by a flexible diaphragm 16. Below the body portion is a hollow, gooseneck housing 17 having a flange 18 at its left-hand end for attachment to the block of an engine (not shown) adjacent cam shaft 19. An operating lever 20 is pivoted in housing 17 and constantly urged against cam 21 by a coiled spring 22. The opposite end of the lever is bifurcated and rests on a pad 23 at the lower end of a stem 24 centrally secured to a diaphragm 25. The diaphragm is clamped between body member 10 and housing 17 and is constantly urged upwardly by a coiled spring 26 seated at its lower end upon a shoulder 27 within casing 17. The opening in the shoulder provided for the stem is sealed by a bushing 28.

The inlet and outlet checks 29 and 30 are mounted in the intermediate body portion and are identical. Each is of integral, molded, synthetic rubber construction, and of general collar button shape, including a relatively thin disk portion 31 and a central, hollow shank portion 32. The shank portion is generally tubular, except for its closed extremity 33, the outer surface of which is enlarged or bulbous. The portion of the pump body provided to accommodate each valve assembly has a central orifice 34 and arcuate slots 35 concentric therewith and at a little distance radially therefrom. These slots constitute the fluid ports. The wall of central orifice 34 at its open end is tapered outwardly, as at 36.

The shank portion 32 of the synthetic rubber valve is inserted into orifice 34 so that the bulbous extremity of the shank is lodged in enlargement 36 of the orifice and disk portion 31 overlies and yieldingly closes ports 35. In order to firmly maintain the assembly, a ball 37 of slightly greater diameter than the interior of hollow shank 32, is pushed into the interior of the shank and lodged at the bottom thereof, as in Fig. 7. The under surface 38 of valve disk 31 is dished and bulbous part 36 of the valve shank is positioned so that, in the assembly, the disk is drawn and resiliently held flat against the ported body structure.

In operation, operating lever 20 is oscillated by cam 21 and spring 22 so as to cause pumping action of diaphragm 25 and alternate forcing fluid inwardly past inlet check 29 and outwardly past outlet check 30. Fig. 8 shows how the disk portion of each check yields to permit the passage of fluid through the porting guarded thereby. The disk snaps back to its seated position when the pressure against it is relieved.

The specific shaping of the disk and shank portions of the valve and also the arrangement of the ported structure is not essential. Obviously, this valve is considerably simpler both in construction and assembly than the valve assemblies now in general use for the purpose.

The exclusive use of all modifications as come within the scope of the appended claim is contemplated.

I claim:

A valve and seat assembly comprising a seat structure with a valve seating face and a central opening and ports spaced therefrom, said opening extending in a direction away from said face and flaring outwardly in said direction, a one-piece valve formed of resilient material including a disk overlying said face and said ports and means to anchor said valve on said seat including a centrally projecting tubular shank with a hollow interior opening through said disk and closed at its other end, said shank having a part extending within the area defined by the flaring portion of said central opening and having its wall thickened at said part, and a ball of greater diameter than said hollow interior of said shank when said shank is unstretched, said ball being seated at the bottom of said hollow interior to expand said closed end and thereby tension said valve on said seat, and to maintain said thickened wall portion resiliently lodged against the flaring wall of said central opening for restraining said shank from longitudinal displacement within said opening.

IRVEN E. COFFEY.

References Cited in the file of this patent

UNITED STATES PATENTS

| Number | Name | Date |
|---|---|---|
| 850,844 | Morgan | Apr. 16, 1907 |
| 1,751,982 | Dunham | Mar. 25, 1930 |
| 2,038,267 | Bullard | Apr. 21, 1936 |
| 2,095,272 | Vanderhoof | Oct. 12, 1937 |
| 2,291,603 | Barker | Aug. 4, 1942 |
| 2,367,883 | Miller | Jan. 23, 1945 |

FOREIGN PATENTS

| Number | Country | Date |
|---|---|---|
| 458,157 | France | of 1913 |